(12) United States Patent
Takemura

(10) Patent No.: US 8,048,939 B2
(45) Date of Patent: Nov. 1, 2011

(54) WATER BASE INK FOR INKJET RECORDING

(75) Inventor: Kazunari Takemura, Wakayama (JP)

(73) Assignee: Kao Corporation, Tokyo (JP)

( * ) Notice: Subject to any disclaimer, the term of this patent is extended or adjusted under 35 U.S.C. 154(b) by 891 days.

(21) Appl. No.: 12/063,580

(22) PCT Filed: Aug. 10, 2006

(86) PCT No.: PCT/JP2006/315815
§ 371 (c)(1),
(2), (4) Date: Feb. 12, 2008

(87) PCT Pub. No.: WO2007/020867
PCT Pub. Date: Feb. 22, 2007

(65) Prior Publication Data
US 2009/0142492 A1    Jun. 4, 2009

(30) Foreign Application Priority Data

Aug. 12, 2005  (JP) .................................. 2005-233979
Nov. 2, 2005   (JP) .................................. 2005-319905
Nov. 2, 2005   (JP) .................................. 2005-319906

(51) Int. Cl.
*C09D 11/10* (2006.01)
(52) U.S. Cl. ...................................... 523/160; 523/161
(58) Field of Classification Search .................... 523/160
See application file for complete search history.

(56) References Cited

U.S. PATENT DOCUMENTS

| | | |
|---|---|---|
| 6,378,999 B1 | 4/2002 | Doi et al. |
| 6,852,777 B1 | 2/2005 | Nakano et al. |
| 7,498,364 B2 * | 3/2009 | Sato et al. ..................... 523/210 |
| 2004/0059019 A1 | 3/2004 | Nakano et al. |
| 2004/0116553 A1 | 6/2004 | Nakamura et al. |
| 2005/0020731 A1 * | 1/2005 | Tanaka et al. ................. 523/160 |
| 2005/0054751 A1 * | 3/2005 | Namba et al. ................. 523/160 |
| 2006/0030640 A1 * | 2/2006 | Tsuru et al. ................... 523/160 |

FOREIGN PATENT DOCUMENTS

| | | |
|---|---|---|
| CN | 1296519 A | 5/2001 |
| JP | 11 140356 | 5/1999 |
| JP | 2001 187851 | 7/2001 |
| JP | 2004 026947 | 1/2004 |
| JP | 2004 083786 | 3/2004 |
| JP | 2004 155818 | 6/2004 |
| JP | 2004 210951 | 7/2004 |

OTHER PUBLICATIONS

Chinese Office Action dated Oct. 12, 2010 in corresponding Chinese Application No. 200680029450.7 (with English Translation).
Office Action issued Mar. 8, 2011, in Chinese Patent Application No. 200680029450.7 (English Translation Only).

* cited by examiner

*Primary Examiner* — David W Wu
*Assistant Examiner* — Vu A Nguyen
(74) *Attorney, Agent, or Firm* — Oblon, Spivak, McClelland, Maier & Neustadt, L.L.P.

(57) ABSTRACT

The present invention relates to a water-based ink for ink-jet printing which is excellent in rubbing resistance upon printing on coated papers such as photographic papers, and also exhibits a high optical density upon printing on plain papers. The water-based ink for ink-jet printing according to the present invention includes a dispersion of a pigment wherein the number of pigment-containing polymer particles in the pigment dispersion which have a particle size of 0.57 μm or more among the pigment-containing polymer particles contained in the pigment dispersion in the ink is $1.2 \times 10^7$/mL or less.

25 Claims, No Drawings

WATER BASE INK FOR INKJET RECORDING

TECHNICAL FIELD

The present invention relates to water based inks for ink-jet printing.

BACKGROUND ART

In ink-jet printing methods, droplets of ink are directly projected onto a recording medium from very fine nozzles and allowed to adhere to the recording medium to form characters and images. The ink-jet printing methods have been rapidly spread because of their various advantages such as easiness of full coloration, low costs, capability of using a plain paper as the recording medium, non-contact with printed images and characters, etc.

Among such printing methods, in recent years, in view of enhancing the weather resistance and water resistance of printed images and characters, an ink-jet printing method utilizing an ink containing a pigment as the colorant has now come to dominate (for example, refer to Patent Document 1).

Also, Patent Document 2 discloses an ink for ink-jet printing which contains a water-insoluble colorant having a number-average molecular weight of from 10 to 100 nm under a dispersed state, a water-soluble high-molecular dispersant having a specific solubility parameter, etc., for the purposes of improving a storage stability of the ink, an unevenness of an optical density of images upon printing and a fixing property of the ink after printing.

Further, Patent Document 3 discloses a recording ink containing a solvent containing at least water and a pigment as a colorant dispersed in the solvent, in which the pigment dispersed in the solvent has an average particle size of from 0.05 to 0.1 μm, and substantially all particle sizes of the pigment are distributed in the range of from 0.01 to 0.3 μm, for the purpose of obtaining such an ink having a low viscosity and a high stability with time.

However, the above conventional inks have failed to satisfy a high rubbing resistance demanded for recent photographic images.

Patent Document 1: PCT Pamphlet WO 00/39226
Patent Document 2: JP 11-140356A
Patent Document 3: JP 07-331147A

DISCLOSURE OF THE INVENTION

Problems to be Solved by the Invention

The present invention relates to a water-based ink for ink-jet printing which is excellent in rubbing resistance upon printing on coated papers such as photographic papers. Also, the present invention relates to a water-based ink for ink-jet printing which exhibits a high optical density upon printing on plain papers.

Means for Solving the Problems

The present invention relates to a water-based ink for ink-jet printing which includes a dispersion of a pigment wherein the number of pigment-containing polymer particles which have a particle size of 0.57 μm or more among the pigment-containing polymer particles contained in the pigment dispersion in the ink is $1.2 \times 10^7$/mL or less, and more particularly to the following inventions (1) to (5):

(1) A water-based ink for ink-jet printing which includes water-insoluble polymer particles containing a pigment, wherein the pigment-containing water-insoluble polymer particles have an average particle size of from 0.03 to 0.25 μm, and the number of the pigment-containing water-insoluble polymer particles having a particle size of 0.57 μm or more among the pigment-containing water-insoluble polymer particles contained in the ink is $1.2 \times 10^7$/mL or less (first invention).

(2) A water-based ink for ink-jet printing which includes water-insoluble polymer particles containing a pigment, wherein a weight ratio of the pigment to the water-insoluble polymer pigment/water-insoluble polymer) in the pigment-containing water-insoluble polymer particles is from 75/25 to 10/90, the pigment-containing water-insoluble polymer particles have an average particle size of from 0.03 to 0.25 μm, and the number of the pigment-containing water-insoluble polymer particles having a particle size of 0.57 μm or more among the pigment-containing water-insoluble polymer particles contained in the ink is $10 \times 10^7$/mL or less (second invention).

(3) A water-based ink for ink-jet printing which includes a dispersion of a yellow pigment, wherein the ink contains the yellow pigment in an amount of 4.5% by weight or more, and the number of pigment-containing polymer particles which have a particle size of 0.57 μm or more among the pigment-containing polymer particles contained in the yellow pigment dispersion in the ink is $1.2 \times 10^7$/mL or less (third invention).

(4) A water-based ink for ink-jet printing which includes a dispersion of a magenta pigment or a dispersion of a cyan pigment, wherein the ink contains the magenta pigment or the cyan pigment in an amount of 3.0% by weight or more, and the number of pigment-containing polymer particles which have a particle size of 0.57 μm or more among the pigment-containing polymer particles contained in the magenta pigment dispersion or the cyan pigment dispersion in the ink is $1.2 \times 10^7$/mL or less (fourth invention).

(5) A process for producing the water-based ink for ink-jet printing as defined in any one of the inventions (1) to (4), including a process for production of a dispersion which includes the following steps (1) and (2):

Step (1): wet-pulverizing a mixture containing the water-insoluble polymer, an organic solvent, the pigment and water in a dispersing apparatus using dispersing media to obtain a dispersion; and Step (2): removing the organic solvent from the dispersion obtained in the step (1) (fifth invention).

Effect of the Invention

In accordance with the present invention, it is possible to obtain a water-based ink for ink-jet printing which is excellent in rubbing resistance upon printing on coated papers such as photographic papers, and it is also possible to obtain a water-based ink for ink-jet printing which exhibits a high optical density upon printing on plain papers.

BEST MODE FOR CARRYING OUT THE INVENTION

The present invention is described in detail below.

The present invention relates to a water-based ink for ink-jet printing which includes a dispersion of a pigment wherein the number of pigment-containing polymer particles which have a particle size of 0.57 μm or more among the pigment-containing polymer particles contained in the pigment dispersion in the ink is $1.2 \times 10^7$/mL or less.

In the present invention, the pigment dispersion is preferably in the form of (i) a dispersion in which the pigment is contained in the water-insoluble polymer particles, i.e., a dispersion of the pigment-containing water-insoluble polymer particles, or (ii) a dispersion in which the pigment is dispersed with the water-soluble polymer. These pigment dispersions are explained in detail below.

[Dispersion of Pigment-Containing Water-Insoluble Polymer Particles]

In the present invention, the water-insoluble polymer particles contain the pigment, and are used for the purposes of enhancing a rubbing resistance of the pigment upon printing on papers, etc.

Water-Insoluble Polymer

As the polymer forming the water-insoluble polymer particles, a water-insoluble polymer is used to facilitate inclusion of the pigment in the polymer. The water-insoluble polymer used herein means such a polymer exhibiting a solubility in water of 10 g or lower, preferably 5 g or lower and more preferably 1 g or lower when the polymer is dried at 105° C. for 2 h, and then dissolved in 100 g of water at 25° C. The solubility of the polymer having a salt-forming group means a solubility of the polymer whose salt-forming group is neutralized completely (i.e., 100%) with acetic acid or sodium hydroxide according to the kind of salt-forming group contained in the polymer.

Examples of the water-insoluble polymer used in the present invention include water-insoluble vinyl polymers, water-insoluble ester-based polymers and water-insoluble urethane-based polymers. Among these water-insoluble polymers, preferred are water-insoluble vinyl polymers in view of a good dispersion stability of the resultant water dispersion.

The water-insoluble vinyl polymers are polymers obtained by addition polymerization of vinyl monomers such as vinyl compounds, vinylidene compounds and vinylene compounds.

The water-insoluble vinyl polymers used in the present invention are preferably such water-insoluble vinyl polymers which are produced by copolymerizing a monomer mixture containing (a) a salt-forming group-containing monomer (hereinafter occasionally referred to merely as a "component (a)"), and (b) a macromer (hereinafter occasionally referred to merely as a "component (b)") and/or (c) a hydrophobic monomer (hereinafter occasionally referred to merely as a "component (c)") (such a mixture is hereinafter occasionally referred to merely as a "monomer mixture"). The water-insoluble vinyl polymers contain a constitutional unit derived from the component (a), and a constitutional unit derived from the component (b) and/or a constitutional unit derived from the component (c).

The salt-forming group-containing monomer (a) is used for enhancing a dispersion stability of the resultant water dispersion. Examples of the salt-forming group include a carboxyl group, a sulfonic group, a phosphoric group, an amino group and an ammonium group.

Examples of the salt-forming group-containing monomers include cationic monomers and anionic monomers. Specific examples of the salt-forming group-containing monomers include those cationic monomers and anionic monomers as described in the paragraph [0022] of JP 9-286939A.

Typical examples of the cationic monomers include unsaturated amine-containing monomers and unsaturated ammonium salt-containing monomers. Among these cationic monomers, preferred are N,N-dimethylaminoethyl(meth)acrylate, N-(N',N'-dimethylaminopropyl)(meth)acrylamide and vinyl pyrrolidone.

Typical examples of the anionic monomers include unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. Examples of the unsaturated sulfonic acid monomers include styrenesulfonic acid, 2-acrylamido-2-methylpropanesulfonic acid, 3-sulfopropyl (meth)acrylate and bis(3-sulfopropyl)itaconic ester. Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, in view of a good dispersion stability of the water-insoluble polymer particles, preferred are the unsaturated carboxylic acid monomers, and more preferred are acrylic acid and methacrylic acid.

The macromer (b) is used in view of enhancing a dispersion stability and a rubbing resistance of the polymer particles, etc., in particular, when the polymer particles contain the pigment. The macromer (b) is in the form of a monomer containing a polymerizable unsaturated group which has a number-average molecular weight of from 500 to 100,000 and preferably from 1,000 to 10,000. Meanwhile, the number-average molecular weight of the macromer (b) may be measured by gel chromatography using chloroform containing 1 mmol/L of dodecyl dimethylamine as a solvent and using polystyrene as a standard substance.

Among these macromers (b), in view of a good dispersion stability and a good rubbing resistance of the polymer particles, etc., preferred are styrene-based macromers and aromatic group-containing (meth)acrylate-based macromers which have a polymerizable functional group at one terminal end thereof.

Examples of the styrene-based macromers include homopolymers of styrene-based monomers, and copolymers of the styrene-based monomers with other monomers. Examples of the styrene-based monomers (b-1) include styrene, 2-methyl styrene, vinyl toluene, ethylvinyl benzene, vinyl naphthalene and chlorostyrene.

As the aromatic group-containing (meth)acrylate-based macromers, there are used homopolymers of an aromatic group-containing (meth)acrylate and copolymers of the aromatic group-containing (meth)acrylate with other monomers. Examples of the aromatic group-containing (meth)acrylate (b-2) include (meth)acrylates containing an arylalkyl group having 6 to 22 carbon atoms, preferably 6 to 18 carbon atoms and more preferably 6 to 12 carbon atoms which may have a substituent group containing a hetero atom, or an aryl group having 6 to 22 carbon atoms, preferably 6 to 18 carbon atoms and more preferably 6 to 12 carbon atoms which may have a substituent group containing a hetero atom. Examples of the substituent group containing a hetero atom include a halogen atom, an ester group, an ether group and a hydroxyl group. Examples of the aromatic group-containing (meth)acrylate include benzyl (meth)acrylate, phenoxyethyl (meth)acrylate, 2-hydroxy-3-phenoxypropyl acrylate and 2-methacryloyloxyethyl-2-hydroxypropyl phthalate. Among these aromatic group-containing (meth)acrylates, especially preferred is benzyl (meth)acrylate.

The polymerizable functional group bonded to one terminal end of these macromers is preferably an acryloyloxy group or a methacryloyloxy group. Examples of the preferred other monomers copolymerizable with the styrene-based monomer or the aromatic group-containing (meth)acrylate include acrylonitrile, etc.

The content of the styrene-based monomer (b-1) in the styrene-based macromer or the content of the aromatic group-containing (meth)acrylate (b-2) in the aromatic group-containing (meth)acrylate-based macromer is preferably 50% by weight or more and more preferably 70% by weight or more in view of enhancing an affinity to the pigment.

The macromer (b) may further contain a side chain composed of other constitutional units derived from an organopolysiloxane, etc. Such a side chain may be produced, for example, by copolymerizing the macromer with a silicone-based macromer having a polymerizable functional group at one terminal end thereof which is represented by the following formula (1):

(1)

wherein t is a number of from 8 to 40.

The styrene-based macromer as the component (b) is commercially available, for example, from Toagosei Co., Ltd., as product names of AS-6(S), AN-6(S), HS-6(S), etc.

The hydrophobic monomer (c) is used in view of enhancing an optical density and a rubbing resistance of the polymer particles. Examples of the hydrophobic monomer (c) include alkyl (meth)acrylates (c-1) and aromatic group-containing monomers (c-2).

The preferred alkyl (meth)acrylates (c-1) are those containing an alkyl group having 1 to 22 carbon atoms and preferably 6 to 18 carbon atoms. Examples of the alkyl (meth)acrylates (c-1) include methyl (meth)acrylate, ethyl (meth)acrylate, (iso)propyl (meth)acrylate, (iso- or tertiary-)butyl (meth)acrylate, (iso)amyl (meth)acrylate, cyclohexyl (meth)acrylate, 2-ethylhexyl (meth)acrylate, iso)octyl (meth)acrylate, (iso)decyl (meth)acrylate, (iso)dodecyl (meth)acrylate and (iso)stearyl (meth)acrylate.

Meanwhile, the terms "(iso- or tertiary-)" and "(iso)" used herein mean both the structure in which the groups expressed by "iso" and "tertiary" are present, and the structure in which these groups are not present (i.e., normal) and the "(meth)acrylate" means acrylate, or methacrylate.

The aromatic group-containing monomer (c-2) is preferably a vinyl monomer containing an aromatic group having 6 to 22 carbon atoms and preferably 6 to 12 carbon atoms which may contain a substituent group having a hetero atom. Examples of the aromatic group-containing monomer (c-2) include the above styrene-based monomer (component b-1), and the above aromatic group-containing (meth)acrylate (component b-2). Examples of the substituent group having a hetero atom include those used for the component (b-2).

Among these styrene-based monomers (b-1), especially preferred are styrene and 2-methyl styrene. The content of the component (b-1) in the hydrophobic monomer (c) is preferably from 10 to 100% by weight and more preferably from 20 to 80% by weight in view of enhancing a rubbing resistance of the polymer particles.

Also, examples of the preferred aromatic group-containing (meth)acrylate (b-2) include benzyl (meth)acrylate and phenoxyethyl (meth)acrylate. The content of the component (c-2) in the hydrophobic monomer (c) is preferably from 10 to 100% by weight and more preferably from 20 to 80% by weight in view of enhancing a rubbing resistance of the polymer particles. Further, the components (b-1) and (b-2) are preferably used in combination with each other.

The monomer mixture may further contain (d) a hydroxyl group-containing monomer (hereinafter occasionally referred to merely as a "component (d)"). The hydroxyl group-containing monomer (d) is used in order to exhibit an excellent effect of enhancing a dispersion stability of the resultant water-based ink.

Examples of the component (d) include 2-hydroxyethyl (meth)acrylate, 3-hydroxypropyl (meth)acrylate, polyethylene glycol (n=2 to 30 wherein n represents an average molar number of addition of oxyalkylene groups: this definition is similarly applied to the following descriptions) (meth)acrylate, polypropylene glycol (n=2 to 30) (meth)acrylate, and poly(ethylene glycol (n=1 to 15)/propylene glycol (n=1 to 15)) (meth)acrylate. Among these hydroxyl group-containing monomers, preferred are 2-hydroxyethyl (meth)acrylate, polyethylene glycol monomethacrylate and polypropylene glycol methacrylate.

The monomer mixture may further contain (e) a monomer (hereinafter occasionally referred to merely as a "component (e)") represented by the following formula (2) in view of enhancing a dispersion stability of the resultant water-based ink:

(2)

wherein $R^1$ is a hydrogen atom or a lower alkyl group having 1 to 5 carbon atoms; $R^2$ is a divalent hydrocarbon group having 1 to 30 carbon atoms which may contain a hetero atom; $R^3$ is a monovalent hydrocarbon group having 1 to 30 carbon atoms which may contain a hetero atom; and p represents an average molar number of addition of $R^2O$ groups, and is a number of from 1 to 60 and preferably a number of from 1 to 30.

Examples of the hetero atom which may be contained in $R^2$ and $R^3$ of the formula (2) include a nitrogen atom, an oxygen atom, a halogen atom and a sulfur atom.

Examples of the lower alkyl group having 1 to 5 carbon atoms which is represented by $R^1$ include methyl, ethyl and (iso)propyl.

Examples of the $R^2O$ group include oxyethylene, oxy(iso)propylene, oxytetramethylene, oxyheptamethylene, oxyhexamethylene, and an oxyalkylene group having 2 to 7 carbon atoms which is constituted from combination of at least two of these groups.

Examples of the $R^3$ group include an aliphatic alkyl group having 1 to 30 carbon atoms and preferably 1 to 20 carbon atoms, an aromatic ring-containing alkyl group having 7 to 30 carbon atoms and a hetero ring-containing alkyl group having 4 to 30 carbon atoms.

Specific examples of the component (e) include methoxy polyethylene glycol (p in the formula (2): 1 to 30; this definition is similarly applied to the following compounds) (meth)acrylate, methoxy polytetramethylene glycol (p=1 to 30) (meth)acrylate, ethoxy polyethylene glycol (p=1 to 30) (meth)acrylate, octoxy polyethylene glycol (p=1 to 30) (meth)acrylate, polyethylene glycol (p=1 to 30) (meth)acrylate 2-ethylhexyl ether, (iso)propoxy polyethylene glycol (p=1 to 30) (meth)acrylate, butoxy polyethylene glycol (p=1 to 30) (meth)acrylate, phenoxy polyethylene glycol (p=1 to 30) (meth)acrylate, methoxy polypropylene glycol (p=1 to 30) (meth)acrylate, phenoxy polypropylene glycol (p=1 to 30) (meth)acrylate, and methoxy (ethylene glycol/propylene glycol copolymer) (p=1 to 30: among which the number of ethylene glycol constitutional units is 1 to 29) (meth)acrylate. Among these compounds, preferred are octoxy polyethylene glycol (p=1 to 30) (meth)acrylate, polyethylene glycol p=1 to 30) (meth)acrylate 2-ethylhexyl ether, and phenoxy [polypropylene glycol (p=1 to 30) or polyethylene glycol (p=1 to 30)] (meth)acrylate.

Specific examples of the commercially available components (d) and (e) include polyfunctional acrylate monomers (NK esters) available from Shin-Nakamura Kagaku Kogyo Co., Ltd., such as "M-40G", "M-90G" and "M-230G"; and BLEMMER Series available from NOF Corporation, such as "PE-90", "PE-200", "PE-350", "P-100", "PME-200", "PME-400", "PME-1000", "PP-500", "PP-800", "PP-1000", "AP-150", "AP-400", "AP-550", "AP-800", "50PEP-300" and "50POEP-800C".

The above components (a) to (e) are respectively used alone or in the form of a mixture of any two or more thereof.

Upon production of the water-insoluble vinyl polymer, the contents of the above components (a) to (e) in the monomer mixture (contents of non-neutralized components; this definition is similarly applied to the following descriptions) or the contents of the respective constitutional units derived from the components (a) to (e) in the water-insoluble vinyl polymer are as follows.

The content of the component (a) is preferably from 3 to 30% by weight and more preferably from 4 to 20% by weight in view of a good dispersion stability of the resultant water dispersion.

The content of the component (b) is preferably from 1 to 25% by weight and more preferably from 5 to 20% by weight, in particular, in view of enhancing a dispersion stability and a rubbing resistance of the polymer particles containing the pigment.

The content of the component (c) is preferably from 10 to 70% by weight and more preferably from 15 to 60% by weight in view of enhancing an optical density and a rubbing resistance of the polymer particles.

The content of the component (d) is preferably from 5 to 40% by weight and more preferably from 7 to 20% by weight in view of a good dispersion stability of the polymer particles.

The content of the component (e) is preferably from 5 to 50% by weight and more preferably from 10 to 40% by weight in view of a good dispersion stability of the polymer particles.

The total content of the components (a) and (d) in the monomer mixture is preferably from 6 to 60% by weight and more preferably from 10 to 50% by weight in view of a good dispersion stability of the polymer particles in water. The total content of the components (a) and (e) in the monomer mixture is preferably from 6 to 75% by weight and more preferably from 13 to 50% by weight in view of a good dispersion stability of the polymer particles in water. The total content of the components (a), (d) and (e) in the monomer mixture is preferably from 6 to 60% by weight and more preferably from 7 to 50% by weight in view of a good dispersion stability of the polymer particles in water.

Also, the weight ratio of the component (a) to a sum of the components (b) and (c) [component (a)/(component (b)+component (c))] is preferably from 0.01 to 1, more preferably from 0.02 to 0.67 and even more preferably from 0.03 to 0.50 in view of a good dispersion stability of the resultant polymer particles.

The water-insoluble polymer used in the present invention may be produced by copolymerizing the monomer mixture by known polymerization methods such as bulk polymerization, solution polymerization, suspension polymerization and emulsion polymerization. Among these polymerization methods, preferred is the solution polymerization.

The solvent used in the solution polymerization method is preferably an organic polar solvent, although not limited thereto. The organic polar solvent miscible with water may be used in the form of a mixture with water. Examples of the organic polar solvents include aliphatic alcohols having from 1 to 3 carbon atoms such as methanol, ethanol and propanol; ketones such as acetone and methyl ethyl ketone; and esters such as ethyl acetate. Among these solvents, preferred are methanol, ethanol, acetone, methyl ethyl ketone and mixed solvents of at least one thereof with water.

The polymerization may be carried out in the presence of a conventionally known radical polymerization initiator, e.g., azo compounds such as 2,2'-azobisisobutyronitrile and 2,2'-azobis(2,4-dimethylvaleronitrile), and organic peroxides such as t-butyl peroxyoctoate and dibenzoyl oxide.

The amount of the radical polymerization initiator to be used in the polymerization is preferably from 0.001 to 5 mol and more preferably from 0.01 to 2 mol per 1 mol of the monomer mixture.

The polymerization may also be carried out in the presence of a conventionally known chain transfer agent, e.g., mercaptans such as octyl mercaptan and 2-mercapto ethanol, and thiuram disulfides.

The polymerization conditions of the monomer mixture vary depending upon the kinds of radical polymerization initiator, monomers, solvent, etc., to be used, and therefore are not particularly limited. The polymerization is generally conducted at a temperature of preferably from 30 to 100° C. and more preferably from 50 to 80° C. for a period of preferably 1 to 20 h. Further, the polymerization is preferably conducted in a nitrogen gas atmosphere or in an atmosphere of an inert gas such as argon.

After completion of the polymerization reaction, the polymer thus produced may be isolated from the reaction solution by a known method such as reprecipitation and removal of solvent by distillation. The thus obtained polymer may be purified by repeated reprecipitation, membrane separation, chromatography, extraction, etc., for removing unreacted monomers, etc., therefrom.

The weight-average molecular weight of the water-insoluble polymer used in the present invention is preferably from 5,000 to 500,000, more preferably from 10,000 to 400,000 and even more preferably from 10,000 to 300,000 in view of a good dispersion stability of the pigment.

Meanwhile, the weight-average molecular weight of the water-insoluble polymer may be measured by gel chromatography using dimethyl formamide containing 60 mmol/L of phosphoric acid and 50 mmol/L of lithium bromide as a solvent and using polystyrene as a standard substance.

When the vinyl polymer used in the present invention contains a salt-forming group derived from the salt-forming group-containing monomer (a), the salt-forming group is neutralized with a neutralizing agent. As the neutralizing agent, acids or bases may be used according to the kind of salt-forming group contained in the polymer. Examples of the neutralizing agent include acids such as hydrochloric acid, acetic acid, propionic acid, phosphoric acid, sulfuric acid, lactic acid, succinic acid, glycolic add, gluconic acid and glyceric acid, and bases such as lithium hydroxide, sodium hydroxide, potassium hydroxide, ammonia, methylamine, dimethylamine, trimethylamine, ethylamine, diethylamine, triethylamine, triethanolamine and tributylamine.

The degree of neutralization of the salt-forming group is preferably from 10 to 200%, more preferably from 20 to 150% and even more preferably from 50 to 150%.

The degree of neutralization of the anionic salt-forming group is calculated according to the following formula:

$$\{[\text{weight } (g) \text{ of neutralizing agent/equivalent of neutralizing agent}]/[\text{add value of polymer (KOH mg/g)} \times \text{weight } (g) \text{ of polymer}/(56 \times 1000)]\} \times 100$$

Also, the degree of neutralization of the cationic salt-forming group is calculated according to the following formula:

{([weight (g) of neutralizing agent/equivalent of neutralizing agent]/[amine value of polymer (HCl mg/g)×weight (g) of polymer/(36.5×1000)]}×100

The acid value or amine value may be calculated from the respective constitutional units of the polymer, or may also be determined by the method of subjecting a solution prepared by dissolving the polymer in an appropriate solvent such as methyl ethyl ketone to titration.

Water-Insoluble Polymer Particles

The average particle size of the water-insoluble polymer particles containing the pigment which is contained in the resultant water-based ink is preferably from 0.03 to 0.25 μm, more preferably from 0.05 to 0.2 μm and even more preferably from 0.07 to 0.15 μm in view of preventing clogging of nozzles in a printer and enhancing a rubbing resistance of the polymer particles. Meanwhile, the average particle size may be measured by a light scattering method using a laser light, more specifically, by using a laser particle analyzing system "ELS-8000" (cumulant analysis) available from Otsuka Denshi Co., Ltd., under the following conditions:

Temperature: 25° C.;
Angle between incident light and detector: 900; and
Cumulative frequency: 100 times Further, a refractive index of water (1.333) is input to the analyzing system as a refractive index of the dispersing medium, and a concentration of the water dispersion to be measured is usually set to about $5 \times 10^{-3}$% by weight.

The ratio of the average particle size of the pigment-containing water-insoluble polymer particles to an average primary particle size of the pigment [(average particle size of the pigment-containing water-insoluble polymer particles)/(average primary particle size of the pigment)] is preferably from 1.001 to 4 and more preferably from 1.01 to 3 in view of a good rubbing resistance and a good gloss of the resultant ink.

[Dispersion of Pigment Dispersed with Water-Soluble Polymer]

Water-Soluble Polymer

The "water-soluble polymer" used in the pigment dispersion means such a polymer exhibiting a solubility in water of 10 g or more and preferably 50 g or more as measured at 25° C. by dissolving the polymer in 100 g of water. The solubility of the polymer having a salt-forming group means a solubility of the polymer whose salt-forming group is neutralized completely (i.e., 100%) with sodium hydroxide or acetic add according to the kind of salt-forming group contained in the polymer.

The degree of neutralization of the water-soluble polymer is preferably from 50 to 150% in view of a good dispersion stability of the pigment dispersion. The degree of neutralization of the water-soluble polymer may be determined according to the formulae described previously.

The neutralizing agent used upon the neutralization of the water-soluble polymer may be appropriately selected according to the kind of salt-forming group contained in the water-soluble polymer. Examples of the neutralizing agent used for neutralizing the water-soluble polymer obtained from the cationic monomer include acetic acid, methoxyacetic acid, propionic acid, lactic add, succinic acid, glycolic acid, gluconic acid and glyceric acid. Examples of the neutralizing agent used for neutralizing the water-soluble polymer obtained from the anionic monomer include tertiary amines such as trimethylamine and triethylamine, sodium hydroxide, potassium hydroxide, lithium hydroxide and ammonia.

Examples of the water-soluble polymer include water-soluble vinyl polymers, water-soluble ester-based polymers and water-soluble urethane-based polymers. Among these polymers, preferred are water-soluble vinyl polymers.

The water-soluble vinyl polymers used in the present invention are preferably such copolymers produced by polymerizing a monomer composition containing (a) a salt-forming group-containing monomer and (c) a hydrophobic monomer. Meanwhile, the monomer composition may also contain (e) a nonionic hydrophilic monomer, if required.

Examples of the salt-forming group-containing monomer (a), the hydrophobic monomer (c) and the nonionic hydrophilic monomer (e) include the same monomers as described above for the component (a), the component (c) and the component (e), respectively, which are used for the water-insoluble vinyl polymers.

The contents of the salt-forming group-containing monomer (a), the hydrophobic monomer (c) and the nonionic hydrophilic monomer (e) in the monomer composition which are used as raw materials of the water-soluble polymer, or the contents of the constitutional units derived from these monomers in the water-soluble polymer are not particularly limited as long as the water-soluble polymer can be dissolved in water after neutralized, and the resultant ink is excellent in dispersion stability of the pigment therein and can exhibit an excellent ejection property, and are usually as follows.

The content of the salt-forming group-containing monomer (a) is preferably from 30 to 90% by weight and more preferably from 30 to 70% by weight.

The content of the hydrophobic monomer (c) is preferably from 10 to 70% by weight and more preferably from 30 to 70% by weight.

The content of the nonionic hydrophilic monomer (e) is preferably from 0 to 75% by weight and more preferably from 1 to 60% by weight.

Further, the total content of the salt-forming group-containing monomer (a) and the nonionic hydrophilic monomer (e) in the monomer composition is preferably from 30 to 80% by weight and more preferably from 30 to 70% by weight.

In the present invention, it is preferred that content of the salt-forming group-containing monomer (a) in the monomer composition is from 30 to 90% by weight; the content of the hydrophobic monomer (c) in the monomer composition is from 10 to 70% by weight; the content of the nonionic hydrophilic monomer (e) in the monomer composition is from 0 to 75% by weight; and the total content of the salt-forming group-containing monomer (a), the hydrophobic monomer (c) and the nonionic hydrophilic monomer (e) in the monomer composition is from 30 to 80% by weight. Further, in the present invention, it is more preferred that the monomer composition contains from 30 to 70% by weight of the salt-forming group-containing monomer (a), from 30 to 70% by weight of the hydrophobic monomer (c) and from 1 to 60% by weight of the nonionic hydrophilic monomer (e); and the total content of the salt-forming group-containing monomer (a) and the nonionic hydrophilic monomer (e) in the monomer composition is from 30 to 70% by weight.

The weight-average molecular weight of the water-soluble polymer is from 500 to 30,000, preferably from 800 to 20,000 and more preferably from 1,000 to 10,000 in view of a good dispersion stability of the pigment in the resultant ink and a good viscosity of the ink. The weight-average molecular weight of the water-soluble polymer may be measured by the same method as used for the water-insoluble polymer, Pigment Dispersion The content of the water-soluble polymer in the pigment dispersion is preferably from 5 to 100 parts by weight, more preferably from 7 to 80 parts by weight and even more preferably from 10 to 60 parts by weight on the basis of 100 parts by weight of the pigment in view of a good dispersion stability of the pigment in the resultant ink and a good ejection property of the ink. The water-soluble polymer used in the present invention may be produced by copolymerizing the monomer composition by conventionally known methods.

The ratio of an average particle size of pigment-containing polymer particles in the pigment dispersion to an average primary particle size of the pigment [(average particle size of pigment-containing polymer particles in the pigment dispersion)/(average primary particle size of the pigment)] is preferably from 1.001 to 4 and more preferably from 1.01 to 3 in view of a good rubbing resistance and a good gloss of the resultant ink.

Further, the dispersion in which the pigment is dispersed with the water-soluble polymer may also contain a pigment derivative, a surfactant, etc.

Examples of the pigment derivative include those compounds containing an ionic functional group or a salt of the ionic functional group such as azo derivatives, diazo derivatives, phthalocyanine derivatives, quinacridone derivatives, isoindolinone derivatives, dioxazine derivatives, perylene derivatives, perinone derivatives, thioindigo derivatives, anthraquinone derivatives and quinophthalone derivatives.

Examples of the surfactant include anionic, cationic, nonionic and amphoteric surfactants. Among these surfactants, preferred are anionic surfactants in view of a good dispersion stability and a good ejection property of the resultant ink. Specific examples of the anionic surfactants include a sodium salt of a condensation product of β-naphthalenesulfonic acid and formalin (for example, commercial products available from Kao Corp., under the tradenames such as "DEMOLE N", "DEMOLE RN" and "DEMOLE MS"), and polycarboxylic acid-type high-molecular surfactants (for example, commercial products available from Kao Corp., under the tradenames such as "POISE 520", "POISE 521" and "POISE 530").

The respective contents of the surfactant and the pigment derivative in the pigment dispersion is preferably from 1 to 120 parts by weight, more preferably from 3 to 70 parts by weight and still more preferably from 5 to 30 parts by weight on the basis of 100 parts by weight of the pigment in view of a good dispersion stability of the pigment in the resultant ink and a good ejection property of the ink.

[Water-Based Ink]

The present invention relates to a water-based ink for ink-jet printing which includes the pigment dispersion wherein the number of pigment-containing polymer particles in the pigment dispersion which have a particle size of 0.57 µm or more in the ink is $1.2 \times 10^7$/mL or less.

First Invention

The first invention relates to a water-based ink for ink-jet printing which includes the water-insoluble polymer particles containing the pigment, wherein the pigment-containing water-insoluble polymer particles have an average particle size of from 0.03 to 0.25 µm, and the number of the pigment-containing water-insoluble polymer particles having a particle sue of 0.57 µm or more among the pigment-containing water-insoluble polymer particles contained in the ink is $1.2 \times 10^7$/mL or less.

The pigment-containing water-insoluble polymer particles used in the first invention are the same as described above.

The pigment may be either inorganic or organic. The inorganic or organic pigment may be used in combination with an extender pigment, if required.

Examples of the inorganic pigments include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

Examples of the organic pigments include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Specific examples of the preferred organic pigments include commercially available products marketed under the tradenames such as C.I. Pigment Yellow, C.I. Pigment Red, C.I. Pigment Violet, C.I. Pigment Blue and C.I. Pigment Green, etc., with various product numbers.

More specific examples of the organic pigments include commercially available products with various product numbers such as C.I. Pigment Yellow 13, 17, 74, 83, 97, 109, 110, 120, 128, 139, 151, 154, 155, 174 and 180; C.I. Pigment Red 48, 57:1, 122, 146, 176, 184, 185, 188 and 202; C.I. Pigment Violet 19 and 33; C.I. Pigment Blue 15, 15:1, 15:2, 15:3, 15:4, 16 and 60; and C.I. Pigment Green 7 and 36.

Examples of the extender pigment include silica, calcium carbonate and talc.

The above pigments may be used alone or in the form of a mixture of any two or more thereof.

The average primary particle size of the pigment is preferably from 10 to 200 nm, more preferably from 10 to 100 nm, even more preferably from 20 to 90 nm and further even more preferably from 30 to 80 nm in view of a good dispersibility of the pigment and a good optical density and a good rubbing resistance of the resultant ink. The average primary particle size of the pigment may be measured by a transmission electron microscope. More specifically, primary particle sizes of 500 pigment particles are measured by image analysis using a transmission electron microscope available from Nippon Denshi Co., Ltd., to calculate a number-average value of the thus measured primary particle sizes which is used as the above average primary particle size of the pigment. Meanwhile, the average primary particle size of the pigment having a major axis diameter and a minor axis diameter is calculated from the major axis diameter.

The contents and ratios of the respective components in the water-based ink are as follows.

The content of the water-insoluble polymer particles containing the pigment in the water-based ink is preferably from 2 to 25% by weight, more preferably from 3 to 17% by weight and even more preferably from 4 to 12% by weight in view of a good dispersion stability and a high optical density of the resultant ink.

The content of the water-insoluble polymer in the water-based ink is preferably from 0.2 to 15% by weight, more preferably from 0.7 to 10% by weight and even more preferably from 1 to 8% by weight in view of a high optical density and a good rubbing resistance of the resultant ink.

The content of the pigment in the water-based ink is preferably from 1 to 20% by weight, more preferably from 2 to 15% by weight and even more preferably from 3 to 10% by weight in view of enhancing a dispersion stability and an optical density of the resultant ink.

In the first invention, the number of the pigment-containing water-insoluble polymer particles having a particle size of 0.57 µm or more among the pigment-containing water-insoluble polymer particles contained in the ink is $1.2 \times 10^7$/mL or less, preferably $1.0 \times 10^7$/mL or less and more preferably $0.8 \times 10^7$/mL or less in view of a good rubbing resistance of the polymer particles.

The number of the pigment-containing water-insoluble polymer particles having a particle size of 0.57 μm or more may be measured by a single particle optical sensing method (SPOS), more specifically, by using "ACCUSIZER" available from PARTICLE SIZING SYSTEMS Corp. Upon the measurement, 0.5 mL of the ink was diluted with pure water to obtain 5 mL of a dilute solution of the ink, and the number of the polymer particles having a particle size of 0.57 μm or more which are contained in the diluted ink was measured at 25° C.

In the first invention, the weight ratio of the pigment to the water-insoluble polymer (pigment/water-insoluble polymer) in the pigment-containing water-insoluble polymer particles is preferably from 90/10 to 10/90 and more preferably from 85/15 to 55/45 in view of enhancing a rubbing resistance and a dispersion stability of the polymer particles, and is also preferably from 85/15 to 70/30 and more preferably from 80/20 to 70/30 in view of enhancing a gloss of the resultant ink in addition to the rubbing resistance and dispersion stability.

Second Invention

The second invention relates to a water-based ink for ink-jet printing which includes water-insoluble polymer particles containing a pigment, wherein a weight ratio of the pigment to the water-insoluble polymer (pigment/water-insoluble polymer) in the pigment-containing water-insoluble polymer particles is from 75/25 to 10/90, the pigment-containing water-insoluble polymer particles have an average particle size of from 0.03 to 0.25 μm, and the number of the pigment-containing water-insoluble polymer particles having a particle size of 0.57 μm or more among the pigment-containing water-insoluble polymer particles contained in the ink is $10 \times 10^7$/mL or less. The pigment, the pigment-containing water-insoluble polymer particles, the contents of these components in the water-based ink, etc., are the same as those described in the first invention.

When the weight ratio of the pigment to the water-insoluble polymer in the pigment-containing water-insoluble polymer particles lies within the above-specified range of the second invention, even though the number of the pigment-containing water-insoluble polymer particles having a particle size of 0.57 μm or more among the pigment-containing water-insoluble polymer particles contained in the ink is larger than that of the first invention, the resultant ink can still exhibit a high rubbing resistance.

Also, in the second invention, the number of the pigment-containing water-insoluble polymer particles having a particle size of 0.57 μm or more which are contained in the water-based ink is $10.0 \times 10^7$/mL or less, preferably $9.0 \times 10^7$/mL or less and more preferably $8.5 \times 10^7$/mL or less in view of a good rubbing resistance of the polymer particles. The number of the pigment-containing water-insoluble polymer particles having a particle size of 0.57 μm or more according to the second invention may be measured by the same method as used in the first invention.

In the second invention, the weight ratio of the pigment to the water-insoluble polymer (pigment/water-insoluble polymer) in the pigment-containing water-insoluble polymer particles is from 75/25 to 10/90, preferably from 75/25 to 50/50 and more preferably from 70/30 to 50/50, in particular, in view of excellent rubbing resistance and dispersion stability of the polymer particles.

Third Invention

The third invention relates to a water-based ink for ink-jet printing which includes a dispersion of a yellow pigment, wherein the ink contains the yellow pigment in an amount of 4.5% by weight or more, and the number of pigment-containing polymer particles in the yellow pigment dispersion which have a particle size of 0.57 μm or more in the ink is $1.2 \times 10^7$/mL or less.

The pigment dispersions of the pigment-containing water-insoluble polymer particles, the pigment-containing water-soluble polymer particles, etc., are the same as those described above.

Examples of the yellow pigment used in the third invention include, in particular, those yellow pigments such as azo lake-based pigments, insoluble azo-based pigments, condensed azo-based pigments, polycyclic-based pigments and metal complex-based pigments.

Examples of the azo lake-based pigments include acetoacetic anilide-based pigments. Specific examples of the azo lake-based pigments include C.I. Pigment Yellow 133, 168 and 169.

Examples of the insoluble azo-based pigments include acetoacetic anilide-based monoazo pigments, acetoacetic anilide-based disazo pigments and pyrazolone-based pigments.

Examples of the acetoacetic anilide-based monoazo pigments include Hansa-based pigments and benzimidazolone-based pigments. Specific examples of the Hansa-based pigments include C.I. Pigment Yellow 1, 2, 3, 5, 6, 49, 63, 65, 73, 74, 75, 87, 90, 97, 98, 106, 111, 114, 116, 121, 124, 126, 127, 130, 136, 152, 165, 167, 170, 174, 176 and 188. Specific examples of the benzimidazolone-based pigments include C.I. Pigment Yellow 120, 151, 154, 156, 175, 180, 181 and 194.

Specific examples of the acetoacetic anilide-based disazo pigments include C.I. Pigment Yellow 12, 13, 14, 17, 55, 81, 83, 113, 171 and 172.

Specific examples of the pyrazolone-based pigments include C.I. Pigment Yellow 10 and 60.

Specific examples of the condensed azo-based pigments include C.I. Pigment Yellow 93, 94, 95, 128 and 166.

Examples of the polycyclic-based pigments include isoindolinone-based pigments, flavanthrone-based pigments and quinophthalone-based pigments. Specific examples of the isoindolinone-based pigments include C.I. Pigment Yellow 109, 110 and 173. Specific examples of the flavanthrone-based pigments include C.I. Pigment Yellow 24, etc. Specific examples of the quinophthalone-based pigments include C.I. Pigment Yellow 138, etc.

Specific examples of the metal complex-based pigments include C.I. Pigment Yellow 117, 129, 150, 153, 177, 179, 257 and 271.

Examples of the other pigments usable as the yellow pigment include isoindoline-based pigments such as C.I. Pigment Yellow 139 and 185, and anthraquinone-based pigments such as C.I. Pigment Yellow 99, 108, 123, 147, 193 and 199.

These yellow pigments described above may be used alone or in combination of any two or more thereof.

Among these yellow pigments, preferred are insoluble azo-based pigments such as Hansa-based pigments and benzimidazolone-based pigments; condensed azo pigments; and polycyclic-based pigments such as isoindolinone-based pigments; more preferred are one or more pigments selected from the group consisting of C.I. Pigment Yellow 74, 93, 97, 110, 128 and 151; and in view of a good color developability, even more preferred are one or more pigments selected from the group consisting of C.I. Pigment Yellow 74 and 97.

The average primary particle size of the yellow pigment is preferably from 10 to 200 nm, more preferably from 15 to 180 nm and even more preferably from 20 to 150 nm in view of a good dispersibility of the pigment and a good optical density and a good rubbing resistance of the resultant ink. The average primary particle size of the yellow pigment may be measured by the same method as described in the first invention.

The contents and ratios of the respective components in the water-based ink for ink-jet printing according to the third invention are as follows.

The content of the water-insoluble polymer in the water-based ink when using the dispersion of the water-insoluble polymer particles or the content of the water-soluble polymer in the water-based ink when using the dispersion in which the pigment is dispersed with the water-soluble polymer is preferably from 0.5 to 15% by weight, more preferably from 0.7 to 10% by weight and even more preferably from 1 to 8% by weight in view of a high optical density and a good rubbing resistance of the resultant ink.

The content of the yellow pigment in the water-based ink according to the third invention is preferably 4.5% by weight or more, more preferably 5.0% by weight or more and even more preferably 5.5% by weight or more in view of enhancing a dispersion stability and an optical density of the resultant ink, and is also preferably 15% by weight or less and more preferably 10% by weight or less in view of a good dispersion stability of the resultant ink.

In the third invention, the water dispersion of the water-insoluble polymer particles containing the yellow pigment means such a water dispersion in which a solid component made of the yellow pigment-containing polymer is dispersed in water as a main solvent. The configuration of the water-insoluble polymer particles is not particularly limited as long as the particles are formed from at least the yellow pigment and the water-insoluble polymer. Examples of the configuration of the water-insoluble polymer particles include the particle configuration in which the yellow pigment is enclosed in the respective polymer particles, the particle configuration in which the yellow pigment is uniformly dispersed in the respective polymer particles, and the particle configuration in which the yellow pigment is exposed onto a surface of the respective pigment-containing polymer particles. The weight ratio of the yellow pigment to the water-insoluble polymer (yellow pigment/water-insoluble polymer) in the yellow pigment-containing water-insoluble polymer particles is preferably from 80/20 to 10/90, more preferably from 78/22 to 10/90, even more preferably from 75/25 to 50/50 and further even more preferably from 70/30 to 50/50 in view of excellent rubbing resistance and dispersion stability of the polymer particles.

The average particle size of the pigment-containing polymer particles in the yellow pigment dispersion which is contained in the resultant water-based ink is preferably from 0.03 to 0.25 μm, more preferably from 0.05 to 0.2 μm and even more preferably from 0.07 to 0.15 μm in view of preventing clogging of nozzles in a printer and enhancing a rubbing resistance of the polymer particles. Meanwhile, the average particle size of the pigment-containing polymer particles in the yellow pigment dispersion may be measured by the same method as used for measuring the average particle size of the polymer particles in the first invention.

The ratio of the average particle size of the pigment-containing polymer particles in the yellow pigment dispersion to the average primary particle size of the yellow pigment [(average particle size of pigment-containing polymer particles in the yellow pigment dispersion)/(average primary particle size of the yellow pigment)] is preferably from 1.001 to 4 and more preferably from 1.01 to 3 in view of a good rubbing resistance and a good gloss of the resultant ink.

In the water-based ink for ink-jet printing according to the third invention, the number of the pigment-containing polymer particles in the yellow pigment dispersion which have a particle size of 0.57 μm or more is $1.2 \times 10^7$/mL or less, preferably $1.0 \times 10^7$/mL or less and more preferably $0.8 \times 10^7$/mL or less in view of a good rubbing resistance of the polymer particles. Meanwhile, the number of the pigment-containing polymer particles in the yellow pigment dispersion may be measured by the same method as used in the first invention.

Fourth Invention

The fourth invention relates to a water-based ink for ink-jet printing which includes a dispersion of a magenta pigment or a dispersion of a cyan pigment, wherein the ink contains the magenta pigment or the cyan pigment in an amount of 3.0% by weight or more, and the number of pigment-containing polymer particles in the magenta pigment dispersion or the cyan pigment dispersion which have a particle size of 0.57 μm or more in the ink is $1.2 \times 10^7$/mL or less.

The pigment dispersions of the pigment-containing water-insoluble polymer particles, the pigment-containing water-soluble polymer particles, etc., are the same as those described above.

Examples of the magenta pigment used in the fourth invention include, in particular, C.I. Pigment Red 1, 2, 3, 4, 5, 6, 7, 8, 9, 10, 17, 22, 23, 30, 31, 38, 88, 112, 114, 122, 123, 146, 149, 166, 168, 170, 172, 177, 178, 179, 185, 190, 193, 202, 209 and 219, and C.I. Pigment Violet 19. Among these magenta pigments, preferred are quinacridone-based pigments such as C.I. Pigment Red 122, 202 and 209 and C.I. Pigment Violet 19, and in view of a good color tone, more preferred are one or more pigments selected from the group consisting of C.I. Pigment Red 122 and C.I. Pigment Violet 19. The above magenta pigments may be used alone or in combination of any two or more thereof.

Examples of the cyan pigment include, in particular, phthalocyanine-based pigments such as C.I. Pigment Blue 15 (phthalocyanine blue R), 15:1, 15:2, 15:3 (phthalocyanine blue G), 15:4, 15:6 (phthalocyanine blue E) and 16 as well as C.I. Pigment Blue 56 and 606. Among these cyan pigments, in view of a good durability to light, heat and solvents, preferred are one or more pigments selected from the group consisting of C.I. Pigment Blue 15:3 and 15:4. The above cyan pigments may be used alone or in combination of any two or more thereof.

The average primary particle size of the magenta pigment or the cyan pigment is the same as that of the yellow pigment used in the third invention.

The contents and ratios of the respective components in the water-based ink for ink-jet printing according to the fourth invention are as follows.

The content of the water-insoluble polymer in the water-based ink when using the dispersion of the water-insoluble polymer particles or the content of the water-soluble polymer in the water-based ink when using the dispersion in which the pigment is dispersed with the water-soluble polymer is preferably from 0.5 to 15% by weight, more preferably from 0.7 to 10% by weight and even more preferably from 1 to 8% by weight in view of a high optical density and a good rubbing resistance of the resultant ink.

The contents of the cyan pigment and the magenta pigment in the water-based ink according to the fourth invention are respectively 3.0% by weight or more, preferably 3.5% by weight or more and more preferably 4.0% by weight or more in view of enhancing a dispersion stability and an optical density of the resultant ink, and is also preferably 15% by weight or less and more preferably 10% by weight or less in view of a good dispersion stability of the resultant ink.

The average particle size of the pigment-containing polymer particles in the magenta pigment dispersion or the cyan pigment dispersion which is contained in the resultant water-based ink is preferably from 0.03 to 0.25 μm, more preferably from 0.05 to 0.2 μm and even more preferably from 0.07 to 0.15 μm in view of preventing clogging of nozzles in a printer and enhancing a rubbing resistance of the polymer particles. Meanwhile, the average particle size of the pigment-containing polymer particles in the magenta pigment dispersion or the cyan pigment dispersion may be measured by the same method as used in the third invention.

The ratio of the average particle size of the pigment-containing polymer particles in the magenta pigment dispersion or the cyan pigment dispersion to the average primary particle size of the magenta pigment or the cyan pigment [(average particle size of pigment-containing polymer particles in the magenta pigment dispersion or the cyan pigment dispersion)/ (average primary particle size of the magenta pigment or the cyan pigment)] is preferably from 1.001 to 4 and more preferably from 1.01 to 3 in view of a good rubbing resistance and a good gloss of the resultant ink.

In the water-based ink for ink-jet printing according to the fourth invention, the number of the pigment-containing polymer particles in the magenta pigment dispersion or the cyan pigment dispersion which have a particle size of 0.57 μm or more among the pigment-containing polymer particles contained in the magenta pigment dispersion or the cyan pigment dispersion is $1.2 \times 10^7$/mL or less, preferably $1.0 \times 10^7$/mL or less and more preferably $0.8 \times 10^7$/mL or less in view of a good rubbing resistance of the resultant ink. Meanwhile, the number of the pigment-containing polymer particles in the magenta pigment dispersion or the cyan pigment dispersion may be measured by the same method as used in the first invention.

In the present invention, the water-based ink means an ink prepared by using water as a main solvent. The content of water in the water-based ink according to the present invention is preferably from 30 to 90% by weight and more preferably from 40 to 80% by weight.

The surface tension of the water-based ink according to the present invention is preferably from 25 to 50 mN/m and more preferably from 27 to 45 mN/m as measured at 20° C.

The viscosity of the water-based ink according to the present invention is preferably from 2 to 12 mPa·s and more preferably from 2.5 to 10 mPa·s as measured at 20° C. to maintain a good ejection property of the resultant ink.

In the water-based ink for ink-jet printing according to the present invention, the rate of increase in average particle size of the pigment-containing polymer particles contained in the pigment dispersion in the water-based ink after being preserved at 90° C. for 48 h is preferably 20% or less and more preferably 10% or less in view of a good dispersion stability of the polymer particles. The rate of increase in average particle size of the pigment-containing polymer particles contained in the pigment dispersion in the water-based ink is represented by the following formula in which the average particle size may be determined by the above measuring method.

Rate (%) of increase in average particle size={[(average particle size of pigment-containing polymer particles contained in the pigment dispersion after preserved)−(average particle size of pigment-containing polymer particles contained in the pigment dispersion before preserved)]/(average particle size of pigment-containing polymer particles contained in the pigment dispersion before preserved)}×100

[Process for Producing Water-Based Ink]

The process for producing a water dispersion used for production of the water-based ink for ink-jet printing according to the present invention is not particularly limited, and there may be used, for example, the following production process.

Process for Producing Dispersion of Pigment-Containing Water-Insoluble Polymer Particles When using the water-insoluble polymer, for example, in the process for producing the respective water-based inks as described in the above first to fourth inventions, the water dispersion may be suitably produced according to the process for producing a dispersion which includes the following steps (1) and (2) (fifth invention).

Step (1): dispersing a mixture containing a water-insoluble polymer, an organic solvent, a pigment and water to obtain a dispersion;

Step (2): removing the organic solvent from the dispersion obtained in the step (1).

In the step (1), the above water-insoluble polymer is first dissolved in the organic solvent, and then the pigment and water, if required, together with a neutralizing agent, a surfactant, etc., are added to the resultant organic solvent solution and mixed together to thereby obtain a dispersion of an oil-in-water type. The content of the pigment in the mixture is preferably from 5 to 50% by weight and more preferably from 7 to 30% by weight; the content of the organic solvent in the mixture is preferably from 5 to 70% by weight and more preferably from 8 to 30% by weight; the content of the water-insoluble polymer in the mixture is preferably from 1 to 40% by weight and more preferably from 2 to 15% by weight; and the content of water in the mixture is preferably from 10 to 80% by weight and more preferably from 20 to 70% by weight.

When the water-insoluble polymer contains a salt-forming group, the neutralizing agent is preferably used in the mixture. The degree of neutralization of the salt-forming group in the water-insoluble polymer is not particularly limited. In general, the degree of neutralization is preferably controlled such that the finally obtained water dispersion exhibits a neutral liquid property, for example, a pH of 4.5 to 10. The pH of the dispersion may also be determined from the desired degree of neutralization for the water-insoluble polymer. Examples of the neutralizing agent used in the present invention include those exemplified above. In addition, there may also be appropriately used such a water-insoluble polymer previously neutralized with the neutralizing agent before mixing.

Examples of the organic solvent include alcohol solvents such as ethanol, isopropanol and isobutanol; ketone solvents such as acetone, methyl ethyl ketone and diethyl ketone; and ether solvents such as dibutyl ether, tetrahydrofuran and dioxane. Among these organic solvents, preferred are those organic solvents whose solubility in water is preferably 50% by weight or lower and 10% by weight or higher as measured at 20° C., and more preferred is methyl ethyl ketone.

The method for dispersing the mixture in the step (1) is not particularly limited. Thus, the polymer particles may be finely divided into fine particles having a desired average particle size only by a substantial dispersion procedure. Preferably, the mixture is first subjected to a preliminary dispersion procedure, and then to the substantial dispersion procedure by applying a shear stress thereto so as to control the average particle size of the obtained polymer particles to a desired value.

To apply the shear stress to the mixture in the substantial dispersion procedure, there may be used, for example, kneading machines such as roll mills, kneaders and extruders, dispersing machines such as sand mills and beads mills; and chamber-type high-pressure homogenizers. In view of reducing the number of the pigment-containing water-insoluble polymer particles having a particle size of 0.57 μm or more among the pigment-containing water-insoluble polymer particles contained in the water-based ink, there is preferably used a wet-pulverization process that is conducted by the dispersing machines using dispersing media. Further, the wet-pulverization process may be followed by a dispersing process using a high-pressure homogenizer, if required.

As the material of the dispersing media, in view of a good hardness, etc., there are preferably used ceramic beads such as titania ($TiO_2$), Zirconia ($ZrO_2$), zircon ($ZrSiO_2$) and alumina ($Al_2O_3$). Among these dispersing media, preferred are titania ($TiO_2$) and zirconia ($ZrO_2$).

The particle size of the dispersing media is usually from 50 to 500 μm and preferably from 80 to 400 μm in view of efficiently reducing the number of the polymer particles having a particle size of 0.57 μm or more.

In the wet-pulverization dispersing procedure, the weight ratio of the dispersing media to the dispersion (containing all components of the dispersion including the organic pigment, the polymer, water, the organic solvent, etc.) [(dispersing media)/(dispersion)] is usually from 10/1 to 4/6 and preferably from 10/1 to 5/5 in view of reducing the number of the polymer particles having a particle size of 0.57 μm or more.

The peripheral speed of the dispersing machines using the dispersing media which are equipped with agitation blades means a speed of an outer periphery of the agitation blades. In the present invention, the peripheral speed of the dispersing machines equipped with the agitation blades is preferably from 3 to 30 m/s and more preferably from 5 to 25 m/s. The peripheral speed of the dispersing machines using the dispersing media which are equipped with no agitation blades means a rotating speed of a container thereof. In the present invention, the peripheral speed of the dispersing machines equipped with no agitation blades is preferably from 0.1 to 1 m/s.

Also, the dispersing time is preferably from 1 to 15 h and more preferably from 2 to 10 h in view of reducing the number of the polymer particles having a particle size of 0.57 μm or more. The temperature used upon the dispersing procedure is preferably from 0 to 60° C. and more preferably from 5 to 30° C. from the same viewpoints as described above.

In the step (2), the organic solvent is removed by distillation from the thus obtained dispersion by known methods to render the dispersion aqueous, thereby obtaining a water dispersion of the pigment-containing polymer particles. The organic solvent is substantially completely removed from the thus obtained water dispersion of the polymer particles. The content of the residual organic solvent in the resultant water dispersion is preferably 0.1% by weight or lower and more preferably 0.01% by weight or lower. Further, in view of reducing the number of the water-insoluble polymer particles having a particle size of 0.57 μm or more among the pigment-containing water-insoluble polymer particles contained in the water-based ink, the water dispersion may also be subjected to centrifugal separation for fractionation thereof.

In the present invention, the water dispersion of the pigment-containing water-insoluble polymer particles means such a dispersion in which a solid component made of the pigment-containing polymer is dispersed in water as a main solvent. The configuration of the water-insoluble polymer particles is not particularly limited as long as the particles are formed from at least the pigment and the water-insoluble polymer. Examples of the configuration of the polymer particles include the particle configuration in which the pigment is enclosed in the respective polymer particles, the particle configuration in which the pigment is uniformly dispersed in the respective polymer particles, and the particle configuration in which the pigment is exposed onto a surface of the respective pigment-containing polymer particles.

Process for Producing Dispersion in which Pigment is Dispersed with Water-Soluble Polymer The process for producing the dispersion in which the pigment is dispersed with the water-soluble polymer is not particularly limited. The dispersion may be obtained by mixing the water-soluble polymer, the pigment, water and, if required, a neutralizing agent with each other. The content of the pigment in the mixture is preferably from 3 to 30% by weight; the content of the water-soluble polymer in the mixture is preferably from 1 to 30% by weight; and the content of water in the mixture is preferably from 40 to 80% by weight.

In addition, if required, in view of reducing the number of the pigment-containing polymer particles in the above pigment dispersion which have a particle size of 0.57 μm or more in the water-based ink, the dispersion in which the pigment is dispersed with the water-soluble polymer may be obtained by the above dispersing methods used for dispersing the pigment with the water-insoluble polymer, i.e., by the dispersing methods using kneading machines such as roll mills, kneaders and extruders, dispersing machines such as sand mills and beads mills; and chamber-type high-pressure homogenizers.

Further, in view of reducing the number of the pigment-containing polymer particles in the pigment dispersion which have a particle size of 0.57 μm or more among the pigment-containing polymer particles contained in the pigment dispersion in the water-based ink, the dispersion may also be subjected to centrifugal separation for fractionation thereof.

The pigment dispersion may be directly used as a water-based ink. Alternatively, the pigment dispersion may be further mixed with various additives ordinarily used for water-based inks for ink-jet printing such as wetting agents, penetrants, dispersants, viscosity modifiers, defoaming agents, mildew-proof agents and rust preventives, and then the resultant dispersion may be used as a water-based ink.

EXAMPLES

The present invention is described in more detail by referring to the following examples. However, it should be noted that the following examples and comparative examples are only illustrative and not intended to limit the invention thereto. Meanwhile, in the following production example, examples and comparative examples, the "part(s)" and "%" indicate "part(s) by weight" and "% by weight", respectively, unless otherwise specified.

Production Examples 1 and 2

Twenty parts of methyl ethyl ketone and 0.03 part of a chain transfer agent (2-mercaptoethanol) together with 10% of 200 parts of a monomer mixture shown in Table 1 were charged into a reaction vessel and mixed with each other, and then the reaction vessel was fully purged with a nitrogen gas to thereby obtain a mixed solution.

Separately, remaining 90% of the monomer mixture shown in Table 1 was charged into a dropping funnel, and further 0.27 part (0.17 part in Production Example 2) of the chain transfer agent, 60 parts of methyl ethyl ketone and 1.2 parts (1.1 parts in Production Example 2) of a radical polymerization initiator (2,2'-azobis(2,4-dimethylvaleronitrile)) were added thereto and mixed with each other, and the dropping funnel was fully purged with a nitrogen gas to thereby obtain a mixed solution.

The mixed solution in the reaction vessel was heated to 65° C. under stirring in a nitrogen atmosphere, and then the mixed solution in the dropping funnel was gradually dropped thereinto over 3 h. After the elapse of 2 h from completion of the dropping while maintaining the temperature at 65° C., a solution prepared by dissolving 0.3 part of the radical polymerization initiator in 5 parts of methyl ethyl ketone was added to the thus obtained mixed solution, and the resultant reaction solution was further aged at 65° C. for 2 h and then at 70° C. for 2 h to obtain a solution of a polymer.

The weight-average molecular weight of the obtained polymer was measured by the above method. The results are shown in Table 1.

Meanwhile, the details of the respective compounds shown in Table 1 are as follows.

Styrene Macromer: "AS-6S" (tradename) available from Toagosei Corp.; 50% toluene solution; solid content: 50%; number-average molecular weight: 6000; polymerizable functional group: methacryloyloxy group.

Polyethylene glycol monomethacrylate (average molar number of addition of ethyleneoxide: 9; "NK-ESTER M-90G" (tradename) available from Shin-Nakamura Kagaku Kogyo Co., Ltd.

Polypropylene glycol monomethacrylate (average molar number of addition of propyleneoxide: 9; "BLEMMER PP-500" (tradename) ("BLENDMER-PP-800" in Production Example 2) available from NOF Corporation.

TABLE 1

| Kind of monomer (% by weight) | Production Example 1 | Production Example 2 |
|---|---|---|
| (a) Methacrylic acid | 10 | 10 |
| (b) Styrene macromer (solid content) | 15 | 10 |
| (c) Benzyl methacrylate | 40 | 40 |
| (c) Styrene | 10 | 10 |
| (d) Polyethylene glycol monomethacrylate | 5 | 15 |
| (d) Polypropylene glycol monomethacrylate | 20 | 15 |
| Weight-average molecular weight | 150,000 | 200,000 |

Example 1

Twenty five parts of the polymer produced by drying the polymer solution obtained in Production Example 1 under reduced pressure was dissolved in 70 parts of methyl ethyl ketone. Further, 4.1 parts of a neutralizing agent (5N sodium hydroxide aqueous solution) and 230 parts of ion-exchanged water were added to the resultant solution to neutralize a salt-forming group of the polymer (degree of neutralization: 75%). Next, 75 parts of a diazo pigment (Yellow: Y; C.I. Pigment Yellow 74 (P.Y. 74); average primary particle size: 40 nm; "FY7413 (tradename)" available from Sanyo Pigment Co., Ltd.) was added into the reaction solution, and then the obtained mixture was subjected to dispersion treatment using "PICOMILL" (dispersing media: zirconia; temperature: 20° C.; weight ratio of dispersing media/dispersion=8/2) available from Asada Tekko Co., Ltd., at a peripheral speed of 15 m/s for 2 h. The resultant mixture was further dispersed by passing through a dispersing apparatus "MICROFLUIDIZER" (tradename) available from Microfluidics Corp., under a pressure of 200 MPa 10 times.

The resultant dispersion was mixed with 250 parts of ion-exchanged water under stirring, and then methyl ethyl ketone was removed from the resultant mixture under reduced pressure at 60° C., followed by further removing a part of water therefrom. The obtained mixture was filtered through a 5 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining a water dispersion of pigment-containing water-insoluble polymer particles having a solid content of 20%.

Forty parts of the thus obtained water dispersion of the pigment-containing water-insoluble polymer particles was mixed with 10 parts of glycerol, 7 parts of triethylene glycol monobutyl ether, 1 part of "SURFYNOL 465" available from Nissin Chemical Industry Co., Ltd., 0.3 part of "Ploxel XL2" available from Avecia SK and 41.7 parts of ion-exchanged water. The resultant mixed solution was filtered through a 1.2 μm-mesh filter (acetyl cellulose membrane; outer diameter: 2.5 cm; available from Fuji Photo Film Co., Ltd.) fitted to a 25 mL syringe without a needle to remove coarse particles therefrom, thereby obtaining a water-based ink 1.

Example 2

The same procedure as in Example 1 was repeated except that the treatment using the "PICOMILL" available from Asada Tekko Co., Ltd., was conducted at a peripheral speed of 8 m/s for 12.5 h, thereby obtaining a water-based ink 2.

Example 3

Thirty five parts of the polymer produced by drying the polymer solution obtained in Production Example 1 under reduced pressure was dissolved in 100 parts of methyl ethyl ketone. Further, 5.8 parts of a neutralizing agent (5N sodium hydroxide aqueous solution) and 300 parts of ion-exchanged water were added to the resultant solution to neutralize a salt-forming group of the polymer (degree of neutralization: 75%). Next, 65 parts of a diazo pigment (Yellow: Y; C.I. Pigment Yellow 74 (P.Y. 74); average primary particle size: 40 nm; "FY7413 (tradename)" available from Sanyo Pigment Co., Ltd.) was added into the reaction solution, and then the obtained mixture was subjected to dispersion treatment using "PICOMILL" available from Asada Tekko Co., Ltd., at a peripheral speed of 10 m/s for 4 h. The resultant mixture was further dispersed by passing through a dispersing apparatus "MICROFLUIDIZER" (tradename) available from Microfluidics Corp., under a pressure of 200 MPa 10 times. The subsequent procedure was conducted in the same manner as in Example 1, thereby obtaining a water-based ink 3.

Example 4

The same procedure as in Example 1 was repeated except for using an unsubstituted quinacridone pigment (C.I. Pigment Violet 19 "Hostaperm Red E5B02 (tradename)" available from Clariant Japan Co., Ltd.) in place of the diazo pigment, thereby obtaining a water-based ink 4.

Comparative Example 1

The same procedure as in Example 1 was repeated except that the treatment using the "PICOMILL" available from Asada Tekko Co., Ltd., was conducted at a peripheral speed of 12 m/s for 2 h, thereby obtaining a water-based ink 5.

Comparative Example 2

The same procedure as in Example 1 was repeated except that the treatment using the "PICOMILL" available from Asada Tekko Co., Ltd., was conducted at a peripheral speed of 8 m/s for 3 h, thereby obtaining a water-based ink 6.

Comparative Example 3

The same procedure as in Example 1 was repeated except that the treatment using the "PICOMILL" available from Asada Tekko Co., Ltd., was conducted at a peripheral speed of 12 m/s for 1 h, thereby obtaining a water-based ink 7.

Comparative Example 4

The same procedure as in Example 3 was repeated except that a three-roll mill was used as a dispersing apparatus in place of the "PICOMILL" and the dispersing treatment was conducted for 1 h, thereby obtaining a water-based ink 8.

The respective water-based inks 1 to 8 thus obtained above were subjected to measurements of an average particle size of the polymer particles, the number of the polymer particles having a particle size of 0.57 μm or more and a rubbing resistance of the inks by the following methods. The results are shown in Table 2.

(1) Average Particle Size:

The average particle size of the polymer particles was measured by a cumulant analysis using an analyzing system "ELS-8000" available from Otsuka Denshi Co., Ltd., under the following conditions:

Temperature: 25° C.;
Angle between incident light and detector: 90°; and
Cumulative frequency: of 100 times Further, a refractive index (1.333) of water used as the dispersing medium was input to the analyzing system.

(2) Number of Polymer Particles Having Particle Size of 0.57 μm or More:

The number of the polymer particles having a particle size of 0.57 μm or more was measured by using "ACCUSIZER" available from PARTICLE SIZING SYSTEMS Corp. Upon the measurement, 0.5 mL of the ink was diluted with pure water to obtain 5 mL of a dilute solution of the ink, and the number of the polymer particles having a particle size of 0.57 μm or more which were contained in the diluted ink was measured (measuring temperature: 25° C.).

(3) Rubbing Resistance:

Solid image printing was carried out on a coated paper (photographic paper <glossy> (60° gloss: 41) "KA450PSK (tradename)" available from Epson Co., Ltd.) using an ink-jet printer "Model EM-930C" available from Epson Co., Ltd., under the following printing conditions:

Kind of Paper: Photo Printing Paper; and
Mode set: Photo

After drying the printed paper at 25° C. for 24 h, the printed surface was lightly rubbed with fingers three times. The degree of image breakage on the printed surface upon the respective rubbing actions was evaluated according to the following evaluation criteria to obtain numerical values of a rubbing resistance thereupon and calculate an average value of the obtained numerical values. When the average value of the rubbing resistance was 4.0 or more, it was recognized that the ink was practically usable for photographic purposes.

[Evaluation Criteria]

5: No image breakage was observed irrespective of a viewing angle.
4: Slight image breakage along rubbing traces was observed depending upon a viewing angle.
3: Image breakage along rubbing traces was observed.
2: Clear rubbing traces were observed with severe image breakage.
1: Significant injures of image was apparently observed.

TABLE 2

|  | Examples | | | |
| --- | --- | --- | --- | --- |
|  | 1 | 2 | 3 | 4 |
| Number of particles having a particle size of 0.57 μm or more | $0.4 \times 10^7$ | $0.7 \times 10^6$ | $8.1 \times 10^7$ | $0.8 \times 10^7$ |
| Rubbing resistance | 4.33 | 4.67 | 4.33 | 4.33 |
| Weight ratio of pigment to water-insoluble polymer (pigment/water-insoluble polymer) | 77.5/22.5 | 77.5/22.5 | 65/35 | 77.5/22.5 |
| Average particle size of pigment-containing water-insoluble polymer particles (μm) | 0.092 | 0.079 | 0.111 | 0.103 |
| Average primary particle size of pigment (μm) | 0.040 | 0.040 | 0.040 | 0.080 |
| Ratio of average particle size of pigment-containing water-insoluble polymer particles to average primary particle size of pigment | 2.3 | 1.98 | 2.78 | 1.29 |

|  | Comparative Examples | | | |
| --- | --- | --- | --- | --- |
|  | 1 | 2 | 3 | 4 |
| Number of particles having a particle size of 0.57 μm or more | $1.3 \times 10^7$ | $3.5 \times 10^7$ | $9.6 \times 10^7$ | $15.0 \times 10^7$ |
| Rubbing resistance | 3.67 | 3.33 | 2.67 | 3.67 |
| Weight ratio of pigment to water-insoluble polymer (pigment/water-insoluble polymer) | 77.5/22.5 | 77.5/22.5 | 77.5/22.5 | 65/35 |
| Average particle size of pigment-containing water-insoluble polymer particles (μm) | 0.098 | 0.121 | 0.105 | 0.121 |
| Average primary particle size of pigment (μm) | 0.040 | 0.040 | 0.040 | 0.040 |
| Ratio of average particle size of pigment-containing water-insoluble polymer particles to average primary particle size of pigment | 2.45 | 3.03 | 2.63 | 3.03 |

From the above results, the water-based inks obtained in Examples 1 to 4 exhibited a satisfactory high-level rubbing resistance required for photographic images. In addition, the water-based inks obtained in Examples 1, 2 and 4 were subjected to solid image printing on the same coated paper under the same conditions as used in the above rubbing resistance test, and after allowing the printed paper to stand at 25° C. for 24 h, the 600 gloss thereof was measured using a glossmeter "HANDY GLOSSMETER PG-1" (tradename) available from Nippon Denshoku Industries Co., Ltd. As a result, it was confirmed that these water-based inks had an excellent gloss.

Example 5

After 22.5 parts of the polymer produced by drying the polymer solution obtained in Production Example 2 under reduced pressure was dissolved in 70 parts of methyl ethyl ketone, 4.6 parts of a neutralizing agent (5N sodium hydroxide aqueous solution) and 230 parts of ion-exchanged water were added to the resultant solution to neutralize a salt-forming group of the polymer (degree of neutralization: 75%). Next, 77.5 parts of a diazo pigment (Yellow: Y; C.I. Pigment Yellow 74 (P.Y. 74); average primary particle size: 40 am; "FY7413 (tradename)" available from Sanyo Pigment Co., Ltd.) was added into the reaction solution, and then the obtained mixture was subjected to dispersion treatment using "PICOMILL" (dispersing media: zirconia; temperature: 20° C.; weight ratio of dispersing media/dispersion=8/2) available from Asada Tekko Co., Ltd., at a peripheral speed of 12 m/s for 4 h. The resultant mixture was further dispersed by passing through a dispersing apparatus "MICROFLUID-IZER" (tradename) available from Microfluidics Corp., under a pressure of 200 MPa 10 times.

The resultant dispersion was mixed with 250 parts of ion-exchanged water under stirring, and then methyl ethyl ketone was removed from the resultant mixture under reduced pressure at 60° C., followed by further removing a part of water therefrom. The obtained mixture was filtered through a 5 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining a water dispersion of pigment-containing water-insoluble polymer particles having a solid content of 20%.

Forty parts of the thus obtained water dispersion of the pigment-containing water-insoluble polymer particles was mixed with 10 parts of glycerol, 7 parts of triethylene glycol monobutyl ether, 1 part of "SURFYNOL 465" available from Nissin Chemical Industry Co., Ltd., 0.3 part of "Ploxel XL2" available from Avecia KR and 41.7 parts of ion-exchanged water. The resultant mixed solution was filtered through a 1.2 μm-mesh filter (acetyl cellulose membrane; outer diameter: 2.5 cm; available from Fuji Photo Film Co., Ltd.) fitted to a 25 mL syringe without a needle to remove coarse particles therefrom, thereby obtaining a water-based ink 11.

Example 6

The same procedure as in Example 5 was repeated except that 40 parts of the water dispersion of the pigment-containing water-insoluble polymer particles, 10 parts of glycerol and 41.7 parts of ion-exchanged water were changed to 30 parts, 15 parts and 46.7 parts, respectively, thereby obtaining a water-based ink 12.

Example 7

Thirty five parts of the polymer produced by drying the polymer solution obtained in Production Example 2 under reduced pressure was dissolved in 100 parts of methyl ethyl ketone. Further, 7.2 parts of a neutralizing agent (5N sodium hydroxide aqueous solution) and 300 parts of ion-exchanged water were added to the resultant solution to neutralize a salt-forming group of the polymer (degree of neutralization: 75%). Next, 65 parts of a diazo pigment (Yellow: Y; C.I. Pigment Yellow 74 (P.Y. 74); average primary particle size: 40 nm; "FY7413 (tradename)" available from Sanyo Pigment Co., Ltd.) was added into the reaction solution, and then the obtained mixture was subjected to dispersion treatment using "PICOMILL" available from Asada Tekko Co., Ltd., at a peripheral speed of 15 m/s for 2 h. The resultant mixture was further dispersed by passing through a dispersing apparatus "MICROFLUIDIZER" (tradename) available from Microfluidics Corp., under a pressure of 200 MPa 10 times. The subsequent procedure was conducted in the same manner as in Example 1, thereby obtaining a water-based ink 13.

Example 8

The same procedure as in Example 7 was repeated except that 35 parts of the polymer, 7.2 parts of the neutralizing agent and 65 parts of the diazo pigment were changed to 20 parts, 4.1 parts and 80 parts, respectively, thereby obtaining a water-based ink 14.

Comparative Example 5

The same procedure as in Example 5 was repeated except that the treatment using the "PICOMILL" available from Asada Tekko Co., Ltd., was conducted at a peripheral speed of 12 m/s for 1 h, thereby obtaining a water-based ink 15.

Comparative Example 6

The same procedure as in Example 5 was repeated except that the treatment using the "PICOMILL" available from Asada Tekko Co., Ltd., was conducted at a peripheral speed of 12 m/s for 2 h, and 40 parts of the water dispersion of the pigment-containing water-insoluble polymer particles, 10 parts of glycerol and 41.7 parts of ion-exchanged water were changed to 25 parts, 20 parts and 46.7 parts, respectively, thereby obtaining a water-based ink 16.

Comparative Example 7

Three hundred parts of ion-exchanged water was added to 40 parts of a water-soluble polymer "HPD61J (tradename)" (effective ingredient: 30.5%) available from Joncryl Corp. Next, 60 parts of a diazo pigment (Yellow: Y; C.I. Pigment Yellow 74 (P.Y. 74); average primary particle size: 40 nm; "FY7413 (tradename)" available from Sanyo Pigment Co., Ltd.) was added into the resultant solution, and then the obtained mixture was subjected to dispersion treatment using "PICOMILL" (dispersing media: zirconia; temperature: 20° C.; weight ratio of dispersing media/dispersion=8/2) available from Asada Tekko Co., Ltd., at a peripheral speed of 15 m/s for 2 h. The resultant mixture was further dispersed by passing through a dispersing apparatus "MICROFLUID-IZER" (tradename) available from Microfluidics Corp., under a pressure of 200 MPa 10 times.

The resultant dispersion was mixed with ion-exchanged water under stirring, and then filtered through a 5 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining a water dispersion of pigment-containing water-soluble polymer particles having a solid content of 20%.

Forty parts of the thus obtained water dispersion of the pigment-containing water-soluble polymer particles was mixed with 10 parts of glycerol, 7 parts of triethylene glycol monobutyl ether, 1 part of "SURFYNOL 465" available from Nissin Chemical Industry Co., Ltd., 0.3 part of "Ploxel XL2" available from Avecia EK and 41.7 parts of ion-exchanged water. The resultant mixed solution was filtered through a 1.2 μm-mesh filter (acetyl cellulose membrane; outer diameter: 2.5 cm; available from Fuji Photo Film Co., Ltd.) fitted to a 25 mL syringe without a needle to remove coarse particles therefrom, thereby obtaining a water-based ink 17.

The respective water-based inks 11 to 17 thus obtained above were subjected to measurements of an average particle size of the polymer particles, the number of the polymer particles having a particle size of 0.57 μm or more and a rubbing resistance of the inks by the above methods, as well as measurements of an optical density and a storage stability of the inks by the following methods. The results are shown in Table 3.

(4) Optical Density (Standard Test)

Solid image printing was carried out on a plain paper "KA4250NP (tradename)" commercially available from Seiko Epson Co., Ltd., using an ink-jet printer "Model EM-930C" available from Epson Co., Ltd., under the following printing conditions:

Kind of Paper: Plain Paper; and
Mode set: Photo.

After allowing the printed paper to stand at 25° C. for 1 h, the optical density of images printed was measured at five positions of the printed paper using a Macbeth densitometer "RD914" (product name) available from Macbeth Corp., to calculate an average of the measured values. In view of a high optical density, the thus obtained average value is preferably 1.10 or more.

(5) Storage Stability:

Five milliliters of the ink was weighed and sampled in a 20 mL screw tube. After sealing the tube with a sealing tape, the tube filled with the ink was allowed to stand in a constant-temperature oven set to 90° C. for 2 days (48 h). The average particles sizes of the particles contained in the ink before and after the standing test were measured to calculate a rate of increase in the average particle size thereof. In view of a good dispersion stability, the rate of increase in average particle size of the particles in the ink is preferably 20% or less and more preferably 10% or less.

TABLE 3

| | Examples | | | |
|---|---|---|---|---|
| | 5 | 6 | 7 | 8 |
| Number of particles having a particle size of 0.57 μm or more (number/mL) | $8.0 \times 10^6$ | $6.0 \times 10^6$ | $7.5 \times 10^6$ | $8.5 \times 10^6$ |
| Solubility of polymer | Water-insoluble | Water-insoluble | Water-insoluble | Water-insoluble |
| Weight ratio of pigment to polymer (pigment/polymer) | 77.5/22.5 | 77.5/22.5 | 65/35 | 80/20 |
| Average particle size of particles contained in dispersion (μm) | 0.088 | 0.088 | 0.101 | 0.11 |
| Rubbing resistance | 4.33 | 4.67 | 4.67 | 4 |
| Concentration of pigment (wt %) | 6.2 | 4.65 | 5.2 | 6.4 |
| Optical density | 1.18 | 1.12 | 1.16 | 1.25 |
| Rate of increase in average particle size after being allowed to stand at 90° C. for 2 days (%) | 2 | 2 | 1 | 3 |

| | Comparative Examples | | |
|---|---|---|---|
| | 5 | 6 | 7 |
| Number of particles having a particle size of 0.57 μm or more (number/mL) | $9.0 \times 10^7$ | $5.6 \times 10^7$ | $1.1 \times 10^8$ |
| Solubility of polymer | Water-insoluble | Water-insoluble | Water-soluble |
| Weight ratio of pigment to polymer (pigment/polymer) | 77.5/22.5 | 77.5/22.5 | 60/40 |
| Average particle size of particles contained in dispersion (μm) | 0.11 | 0.11 | 0.09 |
| Rubbing resistance | 2.67 | 3.33 | 2.67 |
| Concentration of pigment (wt %) | 6.2 | 3.88 | 4.8 |
| Optical density | 1.2 | 0.98 | 1.17 |
| Rate of increase in average particle size after being allowed to stand at 90° C. for 2 days (%) | 2 | 1 | 120 |

Example 9

After 22.5 parts of the polymer produced by drying the polymer solution obtained in Production Example 2 under reduced pressure was dissolved in 70 parts of methyl ethyl ketone, 3.7 parts of a neutralizing agent (5N sodium hydroxide aqueous solution) and 230 parts of ion-exchanged water were added to the resultant solution to neutralize a salt-forming group of the polymer (degree of neutralization: 60%). Next, 77.5 parts of a quinacridone pigment (C.I. Pigment Red 122 (P.R. 122); E5B02 (tradename)" available from Clariant Japan Co., Ltd.) was added into the reaction solution, and then the obtained mixture was subjected to dispersion treatment using "PICOMILL" (dispersing media: zirconia; temperature: 20° C.; weight ratio of dispersing media/dispersion=8/2) available from Asada Tekko Co., Ltd., at a peripheral speed of 12 m/s for 4 h. The resultant mixture was further dispersed by passing through a dispersing apparatus "MICROFLUIDIZER" (tradename) available from Microfluidics Corp., under a pressure of 200 MPa 10 times.

The resultant dispersion was mixed with 250 parts of ion-exchanged water under stirring, and then methyl ethyl ketone was removed from the resultant mixture under reduced pressure at 60° C., followed by further removing a part of water therefrom. The obtained mixture was filtered through a 5 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining a water dispersion of pigment-containing water-insoluble polymer particles having a solid content of 20%.

Thirty five parts of the thus obtained water dispersion of the pigment-containing water-insoluble polymer particles was mixed with 12 parts of glycerol, 7 parts of triethylene glycol monobutyl ether, 1 part of "SURFYNOL 465" available from Nissin Chemical Industry Co., Ltd., 0.3 part of "Ploxel XL2" available from Avecia KK and 44.7 parts of ion-exchanged water. The resultant mixed solution was filtered through a 1.2 μm-mesh filter (acetyl cellulose membrane; outer diameter: 2.5 cm; available from Fuji Photo Film Co., Ltd.) fitted to a 25 mL syringe without a needle to remove coarse particles therefrom, thereby obtaining a water-based ink 21.

Example 10

The same procedure as in Example 9 was repeated except that the treatment using the "PICOMILL" available from Asada Tekko Co., Ltd., was conducted at a peripheral speed of 8 m/s for 10 h, thereby obtaining a water-based ink 22.

Example 11

Thirty five parts of the polymer produced by drying the polymer solution obtained in Production Example 2 under reduced pressure was dissolved in 100 parts of methyl ethyl ketone. Further, 5.8 parts of a neutralizing agent (5N sodium hydroxide aqueous solution) and 300 parts of ion-exchanged water were added to the resultant solution to neutralize a salt-forming group of the polymer (degree of neutralization: 60%). Next, 65 parts of a copper phthalocyanine pigment (C.I. Pigment Blue 15:4 (P.B. 15:4); "LX4033 (tradename)" available from Toyo Ink Seizo Co., Ltd.) was added into the reaction solution, and then the obtained mixture was subjected to dispersion treatment using "PICOMILL" available from Asada Tekko Co., Ltd., at a peripheral speed of 15 m/s for 3 h. The resultant mixture was further dispersed by passing through a dispersing apparatus "MICROFLUIDIZER"

(tradename) available from Microfluidics Corp., under a pressure of 200 MPa 10 times. The subsequent procedure was conducted in the same manner as in Example 9, thereby obtaining a water-based ink 23.

Example 12

The same procedure as in Example 11 was repeated except that the treatment using the "PICOMILL" available from Asada Tekko Co., Ltd., was conducted at a peripheral speed of 10 m/s for 8 h, thereby obtaining a water-based ink 24.

Example 13

The same procedure as in Example 11 was repeated except that 35 parts of the polymer, 5.8 parts of the neutralizing agent and 65 parts of the copper phthalocyanine pigment were changed to 20 parts, 3.3 parts and 80 parts, respectively, thereby obtaining a water-based ink 25.

Comparative Example 8

The same procedure as in Example 9 was repeated except that the treatment using the "PICOMILL" available from Asada Tekko Co., Ltd., was conducted at a peripheral speed of 12 m/s for 1 h, thereby obtaining a water-based ink 26.

Comparative Example 9

The same procedure as in Example 9 was repeated except that the treatment using the "PICOMILL" available from Asada Tekko Co., Ltd., was conducted at a peripheral speed of 12 m/s for 2 h, and 35 parts of the water dispersion of the pigment-containing water-insoluble polymer particles, 12 parts of glycerol and 44.7 parts of ion-exchanged water were changed to 15 parts, 25 parts and 51.7 parts, respectively, thereby obtaining a water-based ink 27.

Comparative Example 10

Three hundred parts of ion-exchanged water was added to 40 parts of a water-soluble polymer "HPD61J (tradename)" (effective ingredient: 30.5%) available from Joncryl Corp. Next, 60 parts of a copper phthalocyanine pigment (C.I. Pigment Blue 15:4 (P.B. 15:4); "LX4033 (tradename)" available from Toyo Ink Seizo Co., Ltd.) was added into the resultant solution, and then the obtained mixture was subjected to dispersion treatment using "PICOMILL" (dispersing media: zirconia; temperature: 20° C.; weight ratio of dispersing media/dispersion=8/2) available from Asada Tekko Co., Ltd., at a peripheral speed of 12 m/s for 2 h. The resultant mixture was further dispersed by passing through a dispersing apparatus "MICROFLUIDIZER" (tradename) available from Microfluidics Corp., under a pressure of 200 MPa 10 times.

The resultant dispersion was mixed with ion-exchanged water under stirring, and then filtered through a 5 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining a water dispersion of pigment-containing water-soluble polymer particles having a solid content of 20%.

Thirty five parts of the thus obtained water dispersion of the pigment-containing water-soluble polymer particles was mixed with 12 parts of glycerol, 7 parts of triethylene glycol monobutyl ether, 1 part of "SURFYNOL 465" available from Nissin Chemical Industry Co., Ltd., 0.3 part of "Ploxel XL2" available from Avecia FK and 44.7 parts of ion-exchanged water. The resultant mixed solution was filtered through a 1.2 μm-mesh filter (acetyl cellulose membrane; outer diameter: 2.5 cm; available from Fuji Photo Film Co., Ltd.) fitted to a 25 mL syringe without a needle to remove coarse particles therefrom, thereby obtaining a water-based ink 28.

The respective water-based inks 21 to 28 thus obtained above were subjected to measurements of an average particle size of the polymer particles, the number of the polymer particles having a particle size of 0.57 μm or more and a rubbing resistance of the inks, as well as measurements of an optical density and a storage stability of the inks by the above methods. The results are shown in Table 4.

TABLE 4

| | Examples | | | |
|---|---|---|---|---|
| | 9 | 10 | 11 | 12 |
| Number of particles having a particle size of 0.57 μm or more (number/mL) | $7.5 \times 10^6$ | $5.5 \times 10^6$ | $6.2 \times 10^6$ | $5.5 \times 10^6$ |
| Solubility of polymer | Water-insoluble | Water-insoluble | Water-insoluble | Water-insoluble |
| Kind of pigment | Magenta E5B02 | Magenta B5B02 | Cyan LX4033 | Cyan LX4033 |
| Weight ratio of pigment to polymer (pigment/polymer) | 77.5/22.5 | 77.5/22.5 | 65/35 | 65/35 |
| Average particle size of particles contained in dispersion (μm) | 0.095 | 0.09 | 0.098 | 0.084 |
| Rubbing resistance | 4.33 | 4.67 | 4.67 | 4.67 |
| Concentration of pigment (wt %) | 5.4 | 5.4 | 4.6 | 4.6 |
| Optical density | 1.10 | 1.12 | 1.08 | 1.09 |
| Rate of increase in average particle size after being allowed to stand at 90° C. for 2 days (%) | 6 | 8 | 3 | 8 |

| | Example | Comparative Examples | | |
|---|---|---|---|---|
| | 13 | 8 | 9 | 10 |
| Number of particles having a particle size of 0.57 μm or more (number/mL) | $7.0 \times 10^6$ | $4.8 \times 10^7$ | $1.6 \times 10^7$ | $8.1 \times 10^7$ |
| Solubility of polymer | Water-insoluble | Water-insoluble | Water-insoluble | Water-soluble |
| Kind of pigment | Cyan LX4033 | Magenta E5B02 | Magenta E5B02 | Cyan LX4033 |
| Weight ratio of pigment to polymer (pigment/polymer) | 80/20 | 77.5/22.5 | 77.5/22.5 | 60/40 |
| Average particle size of particles contained in dispersion (μm) | 0.105 | 0.115 | 0.107 | 0.95 |
| Rubbing resistance | 4.33 | 3 | 3.67 | 2.67 |
| Concentration of pigment (wt %) | 5.6 | 5.4 | 2.3 | 5.4 |
| Optical density | 1.11 | 1.12 | 0.80 | 1.10 |
| Rate of increase in average particle size after being allowed to stand at 90° C. for 2 days (%) | 10 | 6 | 4 | 90 |

What is claimed is:

1. A process for producing a water-based ink for ink-jet printing comprising:
   (1): wet-pulverizing a mixture containing a water-insoluble polymer, an organic solvent, a pigment and water in a dispersing apparatus using a dispersing media,
   (2) dispersing the wet-pulverized mixture using a high-pressure homogenizer to obtain a dispersion; and
   (3): removing the organic solvent from the dispersion obtained in the step (2);

wherein the water-based ink that is produced comprises:
(A) water-insoluble polymer particles containing a pigment, wherein the pigment-containing water-insoluble polymer particles have an average particle size of from 0.03 to 0.25 μm, and
the number of the pigment-containing water-insoluble polymer particles having a particle size of 0.57 μm or more among the pigment-containing water-insoluble polymer particles contained in the ink is $1.2 \times 10^7$/mL or less;
(B) water-insoluble polymer particles containing a pigment, wherein a weight ratio of the pigment to the water-insoluble polymer (pigment/water-insoluble polymer) in the pigment-containing water-insoluble polymer particles is from 75/25 to 10/90,
the pigment-containing water-insoluble polymer particles have an average particle size of from 0.03 to 0.25 μm, and
the number of the pigment-containing water-insoluble polymer particles having a particle size of 0.57 μm or more among the pigment-containing water-insoluble polymer particles contained in the ink is $10 \times 10^7$/mL or less;
(C) water-insoluble polymer particles containing a yellow pigment, wherein the ink contains the yellow pigment in an amount of 4.5% by weight or more, and
the number of the pigment-containing water-insoluble polymer particles having a particle size of 0.57 μm or more in the ink is $1.2 \times 10^7$/mL or less; or
(D) water-insoluble polymer particles containing a magenta pigment or a cyan pigment, wherein the ink contains the magenta pigment or the cyan pigment in an amount of 3.0% by weight or more, and
the number of the pigment-containing water-insoluble polymer particles having a particle size of 0.57 μm or more in the ink is $1.2 \times 10^7$/mL or less.

2. The process for producing the water-based ink for ink-jet printing according to claim 1, wherein the water-based ink comprises (A) and a weight ratio of the pigment to the water-insoluble polymer (pigment/water-insoluble polymer) in the pigment-containing water-insoluble polymer particles is from 90/10 to 10/90.

3. The process for producing the water-based ink for ink-jet printing according to claim 1, wherein the water-based ink comprises (A) or (B) and the ink contains the pigment-containing water-insoluble polymer in an amount of from 2 to 25% by weight.

4. The process for producing the water-based ink for ink-jet printing according to claim 1, wherein the water-based ink comprises (A) or (B) and the ink contains the pigment in an amount of from 1 to 20% by weight.

5. The process for producing the water-based ink for ink jet printing according to claim 1, wherein the water-based ink comprises (A) or (B) and a ratio of the average particle size of the pigment-containing water-insoluble polymer particles to an average primary particle size of the pigment [(average particle size of the pigment-containing water-insoluble polymer particles)/(average primary particle size of the pigment)] is from 1.001 to 4.

6. The process for producing the water-based ink for ink-jet printing according to claim 1, wherein the water-based ink comprises (C) and wherein the yellow pigment is made of at least one pigment selected from the group consisting of C.I. Pigment Yellow 74 and C.I. Pigment Yellow 97.

7. The process for producing the water-based ink for ink jet printing according to claim 1, wherein the water-based ink comprises (D) and the magenta pigment is made of at least one pigment selected from the group consisting of C.I. Pigment Red 122 and C.I. Pigment Violet 19.

8. The process for producing the water-based ink for ink-jet printing according to claim 1, wherein the water-based ink comprises (D) and the cyan pigment is made of at least one pigment selected from the group consisting of C.I. Pigment Blue 15:3 and C.I. Pigment Blue 15:4.

9. The process for producing the water-based ink for ink-jet printing according to claim 1, wherein the water-based ink comprises (C) or (D) and the pigment-containing water-insoluble polymer particles have an average particle size of from 0.03 to 0.25 μm.

10. The process for producing the water-based ink for ink jet printing according to claim 1, wherein the water-based ink comprises (C) or (D) and a rate of increase in average particle size of the pigment-containing polymer particles contained in the water-based ink after being preserved at 90° C. for 48 h is 20% or less.

11. The process for producing the water-based ink for ink-jet printing according to claim 1, wherein the water-insoluble polymer is produced by copolymerizing a mixture comprising 3 to 30% by weight of a salt-forming group-containing monomer, and 10 to 70% by weight of a hydrophobic monomer and/or 1 to 25% by weight of a macromer.

12. The process for producing the water-based ink for ink-jet printing according to claim 1, wherein the pigment has an average primary particle size of from 10 to 200 nm.

13. The method of claim 1, wherein said water-based ink is (A).

14. The method of claim 1, wherein said water-based ink is (B).

15. The method of claim 1, wherein said water-based ink is (C).

16. The method of claim 1, wherein said water-based ink is (D).

17. The method of claim 1, wherein the dispersing medium contains ceramic beads having a particle size of 80 to 400 μm.

18. The method of claim 1, wherein, in (1), a weight ratio of the dispersing medium to the mixture 10/1 to 4/6.

19. The method of claim 1, wherein, in (1), a weight ratio of the dispersing medium to the mixture 10/1 to 5/5.

20. The method of claim 1, wherein the dispersing apparatus is equipped with blades and is operated at a speed of 3 to 30 m/s.

21. The method of claim 1, wherein the dispersing apparatus is not equipped with blades and is operated at a speed of 0.1 to 1 m/s.

22. The method of claim 1, wherein dispersing time ranges from 1 to 15 hrs.

23. The method of claim 1, wherein dispersing temperature ranges from 0 to 60° C.

24. The method of claim 1, wherein in (1), the content of the pigment in the mixture ranges from 5 to 50% by weight, the content of the organic solvent in the mixture ranges from 5 to 70% by weight, the content of the water-insoluble polymer in the mixture ranges from 1 to 40% by weight, and the content of water in the mixture ranges from 10 to 80%.

25. The method of claim 1, wherein in (1), the content of the pigment in the mixture ranges from 7 to 30% by weight, the content of the organic solvent in the mixture ranges from 8 to 30% by weight, the content of the water-insoluble polymer in the mixture ranges from 2 to 15% by weight, and the content of water in the mixture ranges from 20 to 70%.

* * * * *